United States Patent
Wadell

(10) Patent No.: US 9,975,472 B2
(45) Date of Patent: May 22, 2018

(54) CONTROLLABLE LIGHTING ARRANGEMENT FOR A VEHICLE

(71) Applicant: Tyri International, Inc., Stevens Point, WI (US)

(72) Inventor: Christian Wadell, Hisings Backa (SE)

(73) Assignee: Tyri International, Inc., Stevens Point, WI (US)

(*) Notice: Subject to any disclaimer, the term of this patent is extended or adjusted under 35 U.S.C. 154(b) by 0 days. days.

(21) Appl. No.: 15/133,535

(22) Filed: Apr. 20, 2016

(65) Prior Publication Data

US 2016/0318438 A1 Nov. 3, 2016

Related U.S. Application Data

(60) Provisional application No. 62/155,043, filed on Apr. 30, 2015.

(51) Int. Cl.
*B60Q 3/18* (2017.01)
*B60Q 1/14* (2006.01)
(Continued)

(52) U.S. Cl.
CPC ......... *B60Q 1/1423* (2013.01); *B60Q 1/0094* (2013.01); *B60Q 1/143* (2013.01);
(Continued)

(58) Field of Classification Search
CPC .. B60Q 5/00; H05B 37/0218; H05B 33/0842; H05B 33/0854; H05B 33/0815;
(Continued)

(56) References Cited

U.S. PATENT DOCUMENTS

| 5,347,261 A | 9/1994 | Adell |
| 5,426,294 A | 6/1995 | Kobayashi et al. |

(Continued)

FOREIGN PATENT DOCUMENTS

| DE | 102008021688 | 11/2009 |
| EP | 1099802 | 5/2001 |

(Continued)

OTHER PUBLICATIONS

EP SN 15 19 0352, European Search Report, 10 pages, dated Aug. 29, 2016.

(Continued)

*Primary Examiner* — Monica C King
*Assistant Examiner* — Jianzi Chen
(74) *Attorney, Agent, or Firm* — Boyle Fredrickson, S.C.

(57) ABSTRACT

A system for controlling one or more vehicle lights, which can either be retrofitted to an existing vehicle or incorporated into a vehicle during original manufacture. The system may include a light controller operable to control one or more distributed lights, one or more sensors for detecting various ambient conditions, and a user input device having an interface configured to receive commands from a user. The light controller may modify a function of the one or more lights based on detections by the sensors and/or commands from the user input device. A state service may execute to maintain a state flow for the one or more lights based on the detections and/or commands.

17 Claims, 7 Drawing Sheets

(51) Int. Cl.
  *B60Q 1/26* (2006.01)
  *B60Q 1/00* (2006.01)
  *B60Q 1/22* (2006.01)
  *H05B 37/02* (2006.01)
  *B60Q 3/80* (2017.01)

(52) U.S. Cl.
  CPC ............ *B60Q 1/22* (2013.01); *B60Q 1/2603* (2013.01); *B60Q 1/2615* (2013.01); *B60Q 1/2619* (2013.01); *B60Q 3/80* (2017.02); *H05B 37/0218* (2013.01); *H05B 37/0227* (2013.01); *H05B 37/0272* (2013.01); *B60Q 2300/21* (2013.01); *B60Q 2300/314* (2013.01)

(58) Field of Classification Search
  CPC ............ H05B 33/0845; H05B 33/0851; H05B 33/0872; H05B 37/0272; H05B 41/18; B60R 16/023
  See application file for complete search history.

(56) References Cited

U.S. PATENT DOCUMENTS

| | | |
|---|---|---|
| 6,148,212 A | 11/2000 | Park et al. |
| 6,216,489 B1 | 4/2001 | Potnis et al. |
| 6,403,942 B1 | 6/2002 | Stam |
| 6,831,261 B2 | 12/2004 | Schofield et al. |
| 8,100,552 B2 | 1/2012 | Spero |
| 8,536,997 B2 | 9/2013 | De Sanzo |
| 8,768,609 B2 | 7/2014 | Maynard et al. |
| 2009/0140059 A1* | 6/2009 | Barton ................ F24F 11/0012 236/51 |
| 2012/0028680 A1 | 2/2012 | Breed |
| 2013/0056177 A1 | 3/2013 | Coutu et al. |
| 2013/0103236 A1 | 4/2013 | Mehrgan |
| 2013/0234593 A1 | 9/2013 | Nordstrom et al. |
| 2013/0293150 A1* | 11/2013 | Maxik ................ H05B 33/0872 315/297 |
| 2014/0163777 A1 | 6/2014 | Yashiro et al. |
| 2014/0218212 A1 | 8/2014 | Nykerk |
| 2015/0048737 A1 | 2/2015 | Schneider et al. |

FOREIGN PATENT DOCUMENTS

| | | |
|---|---|---|
| EP | 1602117 | 10/2008 |
| EP | 1977929 | 5/2012 |
| EP | 2514636 | 10/2012 |
| WO | 01/70538 | 9/2001 |
| WO | 2001070538 | 9/2001 |
| WO | 2004076226 | 9/2004 |
| WO | 2011161547 | 12/2011 |
| WO | 2013192397 | 12/2013 |

OTHER PUBLICATIONS

EP Appln. No. 16167808.1—European Search Report dated Jan. 2, 2017, 7 pages.

* cited by examiner

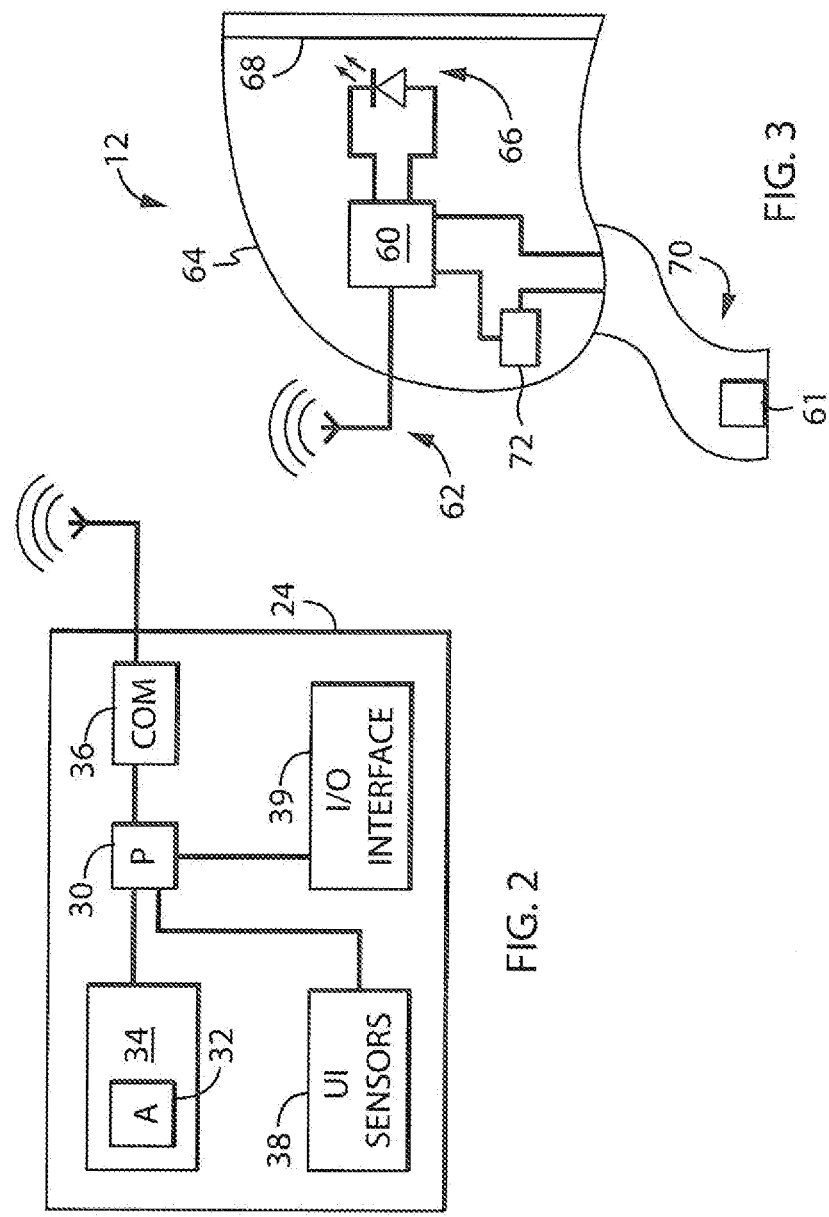

CONTROLLABLE LIGHTING ARRANGEMENT FOR A VEHICLE

CROSS-REFERENCE TO RELATED APPLICATIONS

This application claims priority to U.S. Provisional Patent Application Ser. No. 62/155,043, entitled "Controllable Lighting Arrangement for a Vehicle," filed on Apr. 30, 2015, which is herein incorporated by reference.

FIELD OF THE INVENTION

This invention relates to vehicle lighting, and more particularly to a controllable vehicle lighting arrangement that is capable of varying one or more lighting functions according to certain sensed conditions and/or inputs.

BACKGROUND OF THE INVENTION

A vehicle is typically outfitted with a number of lamps or lights that provide illumination in certain areas. Certain lights may be mounted and configured to illuminate areas within the vehicle interior while others lights may be mounted and configured to illuminate areas exterior to the vehicle. Typically, the interior lights may illuminate areas that facilitate operator ingress or egress, or operation and control of the vehicle. The exterior lights may also facilitate operator ingress or egress, and may also be configured to illuminate other external areas. For example, exterior vehicle lights may provide forward illumination for lighting a path of travel, and rearward or side illumination for safety or providing an indication of a function, such as reverse indicator lights. In a work vehicle, exterior lights may also be provided for illuminating a work area, typically located forward of the cab of the work vehicle.

SUMMARY OF THE INVENTION

The present invention provides a system for controlling one or more vehicle lights, which system can either be retrofitted to an existing vehicle or incorporated into a vehicle during original manufacture. The system may include a light controller operable to control one or more distributed lights, one or more sensors for detecting various ambient conditions, and a user input device having an interface configured to receive commands from a user. The light controller may modify a function of the one or more lights based on detections by the sensors and/or commands from the user input device. A state service may execute to maintain a state flow for the one or more lights based on the detections and/or commands.

A controllable vehicle lighting system of the present invention may involve one or a series of vehicle lights which may be mounted in one or more areas on a vehicle. In a manner as is known, each vehicle light may include a housing, a lamp mounted within the housing for providing illumination, a mounting arrangement by which the housing of the light is secured to an area or component of the vehicle, and an electrical connection for supplying power to the lamp.

In accordance with an aspect of the invention, each light may also include a communication mechanism as well as a controller for controlling one or more lighting functions or parameters. The communication mechanism may be in the form of a wire-type connection, or alternatively may be a wireless connection such as Wi-Fi, Bluetooth, and the like, for receiving signals, such as control signals. The controller may be in the form of a circuit board incorporated into the light for controlling lighting parameters and/or functions, such as ON/OFF, flashing, brightness or intensity (dimming or predetermined output levels), position (in the event the light includes a swivel, pivot or other variable position mechanism), light beam pattern, and/or light color.

In accordance with another aspect of the invention, independently of any light system installation, an external state service may be provided which may act as a unifying environment of all accessible light system installations. The state service may receive input from installations and accompanying devices, such as sensors and/or smart phones. The information may be processed, analyzed and persisted as states to provide knowledge about usage, both historical and present, to users, producers and developers of a controllable lighting arrangement. The state service may be optionally implemented in a cloud computing environment to further enable scalability and accessibility. Such centrally stored knowledge may allow dependable security functions, such as an anti-theft system, as well as construction of a consolidated ecosystem of different installations and versions. Users may be given access to supporting information for their own configurations, both arising from developers of the controllable lighting arrangement, and from the experience of other users.

Specifically then, one aspect of the present invention may provide a light system for a vehicle including: a light having a mounting arrangement for mounting to a vehicle; and a light controller in communication with the light. The light controller may execute a program stored in a non-transient medium operable to: (a) receive a sensor signal corresponding to an ambient condition; (b) receive a command signal corresponding to a command provided by a user, and (c) modify a function of the light according to the sensor signal and the command signal.

The light system may also include a state service in communication with the light controller. The state service may maintain multiple states with each state defining a function of the light. Modifying the function of the light may move from a first state to a second state. In addition, the state service may maintain a state in which a function of a first light differs from a function of a second light. The state service may be a standalone computing device, or may be integrated with the light controller or a user input device, or may be implemented in a cloud computing environment.

Another aspect may provide a light system fix a vehicle including: multiple lights having mounting arrangements for mounting to a vehicle; a light controller in communication with the lights; a sensor in communication with the light controller, the sensor being configured to detect an ambient condition and provide a sensor signal to the light controller corresponding to the ambient condition; and a user input device in communication with the light controller, the user input device being configured to receive a command from a user and provide a command signal to the light controller corresponding to the command. The light controller may be configured to execute a program stored in a non-transient medium operable to: (a) receive the sensor signal corresponding to the ambient condition; (b) receive the command signal corresponding to the command provided by the user; and (c) modify a function of at least one of the lights according to the sensor signal and the command signal.

Another aspect may provide a method for controlling a light having a mounting arrangement for mounting to a vehicle and using a sensor configured to detect an ambient condition and provide a sensor signal corresponding to the ambient condition and a user input device configured to receive a command from a user and provide a command signal corresponding to the command. The method may include: (a) receiving a sensor signal corresponding to an ambient condition; (b) receiving a command signal corresponding to a command provided by a user; and (c) modifying a function of the light according to the sensor signal and the command signal.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which:

FIG. 2 is an exemplary user input device in the light system of FIG. 1;

FIG. 3 is an exemplary light in the light system of FIG. 1;

Figure 1:
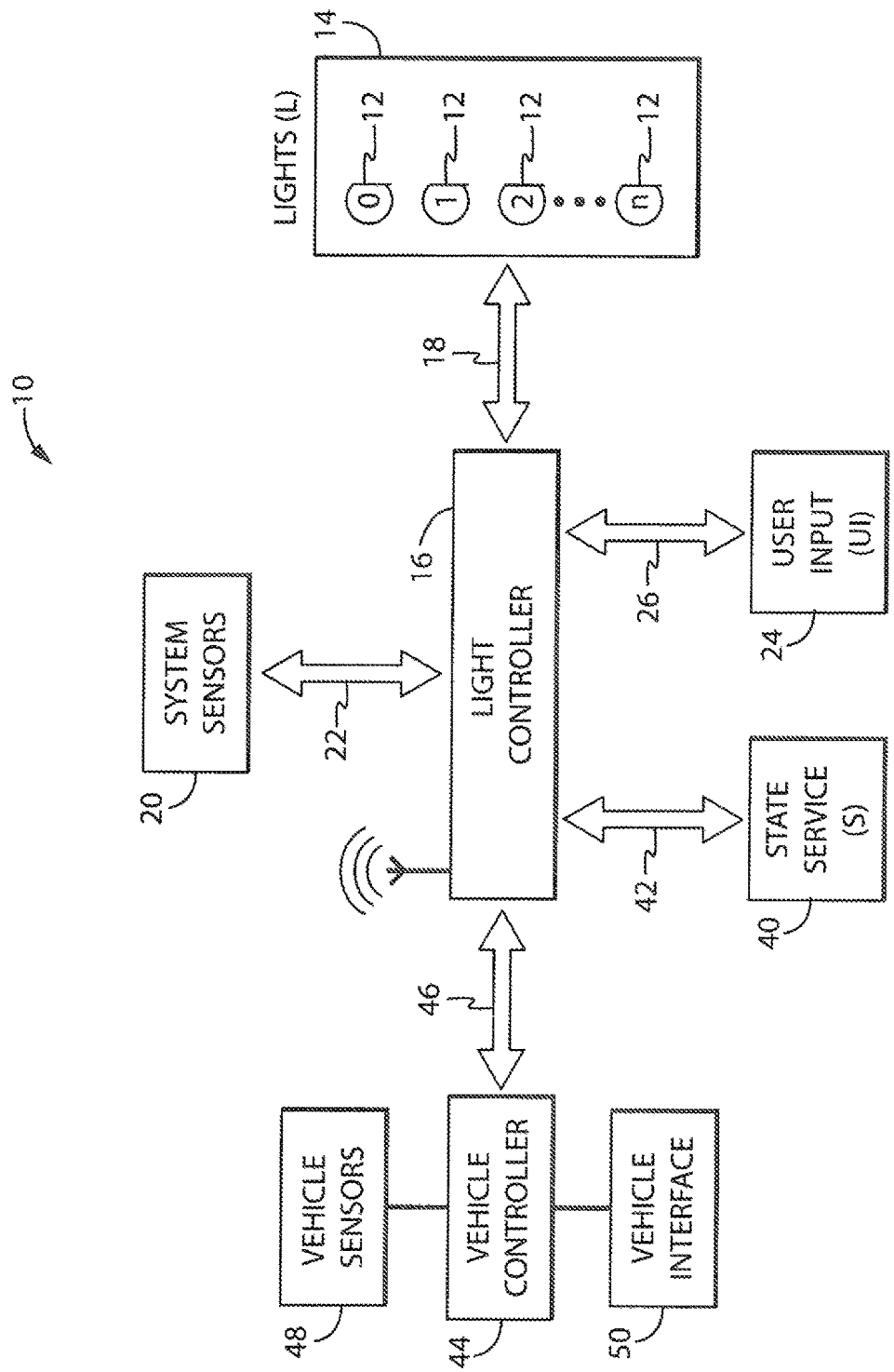
FIG. 1 is an exemplary block diagram of a light system for a vehicle having a light controller, sensors, a user input device and a state service in accordance with an aspect of the present invention.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

In accordance with an aspect of the invention, a controllable vehicle light system 10 may include multiple lights 12 distributed on a vehicle 14. The lights 12 may be connected to one or more light controllers 16 (electronic lighting control units) via a wired or wireless connection 18. The lights 12 may each have a mounting arrangement for mounting to one or more areas which may be distributed on the vehicle 14 and/or a work area.

One or more sensors 20 may also be connected to the one or more light controllers 16 via a wired or wireless connection 22. The sensors 20 may be operable to detect an ambient condition and provide a sensor signal to the light controller 16 corresponding to the ambient condition via the wired or wireless connection 22. The sensors 20 may also be distributed on the vehicle 14 and/or a work area. Exemplary sensors may include, but not be limited to, vehicle operation or condition sensors, ambient light sensors, cameras, GPS sensors, compass or directional sensors, level sensors, and the like.

A user input device 24 (user interface or "UI") may also be connected to the one or more light controllers 16 via a wired or wireless connection 26. The user input device 24 may be operable to receive a command from a user and provide a command signal to the light controller corresponding to the command via the wired or wireless connection 26. With additional reference to FIG. 2, the user input device 24 could be, for example, a smart phone, tablet computer or other mobile computing device. The user input device 24 could be connected to the light controller 16, for example, via Bluetooth or Wi-Fi. The user input device 24 may include processor 30 executing a lighting control application 32 ("A") stored in a non-transient medium 34, such as DRAM or Flash memory, which may be configured to enable a user to provide commands/inputs that control one or more functions or parameters of operation of each light 12 in accordance with certain conditions or operations. The user input device 24 may receive such commands/inputs via a user I/O 39, which may be a touchscreen, and may communicate with the light controller 16 via a communication interface 36. The user input device 24 may also include user sensors 38 for use in the light system 10, which may include, but not be limited to, ambient light sensors, cameras, GPS sensors, compass or directional sensors, level sensors, and the like.

A state service 40 ("S") may also be connected to the one or more light controllers 16 via a wired or wireless connection 42. The state service 40 may maintain multiple states, with each state defining a function of one or more of the lights 12. Accordingly, modifying a function of a light 12 may move from a first state to a second state. The state service 40 may be provided with a state control application ("SA") executing in a non-transient medium and may include a state user interface ("SUI") that is provided with a state user interface application ("SUIA"). The state user interface may be configured to enable a user to provide inputs that control the processing, analysis and persistence of states in accordance with certain conditions or operations. In operation, the state user interface may apply to one or more controllable lighting arrangement products via various state maintainers and/or developers. The state service 40 may be a standalone computing device, may be integrated with the light controller 16, may be integrated with the user input device 24, and/or may be implemented in a cloud computing environment. In addition, several layers of state services may exist simultaneously. For example, a first state service layer may exist for controlling the lights of a vehicle, and a second state service layer may exist for providing global authentication.

A vehicle controller 44 may also be connected to the one or more light controllers 16 via a wired or wireless connection 46. The vehicle controller 44 may be integrated with the vehicle 14 for controlling various conditions or parameters of operation of the vehicle 14. A series of vehicle sensors 48 may also provide inputs to the vehicle controller 44 pertaining to the various conditions or parameters of operation of the vehicle 14, which may be transmitted via a wired or wireless connection to the vehicle controller 44.

The lighting control application 32 may receive and preprocess inputs from the sensors 20, the user sensors 38 and/or the vehicle sensors 48, and may then output control (command) signals to the light controller 16 which may process such signals. The light controller 6 may, in turn, output control signals to the one or more lights 12 so as to control the one or more functions or parameters of operation of each light 12 in accordance with certain conditions or operations detected or sensed by the sensors 20, the user sensors 38 and/or the vehicle sensors 48 and/or provided by the user input device 24. A vehicle user interface 50 may enable an operator to control the various vehicle operating parameters using the vehicle controller 44.

With additional reference to FIG. 3, in an aspect of the invention, each light 12 may include logic 60 in communication with a wired or wireless communication mechanism 62. The logic 60 may control one or more lighting functions or parameters of the light 12. The communication mechanism 62 may be in the form of a wire-type connection, or alternatively may be a wireless connection as shown, such as Wi-Fi, Bluetooth, and the like, for receiving signals, such as control signals. The logic 60 may be in the form of a circuit board incorporated into the light 12 for controlling lighting parameters and/or functions, such as ON/OFF, flashing, brightness or intensity (dimming or predetermined output levels), position (in the event the light includes a swivel, pivot or other variable position mechanism 61), light beam pattern, and/or light color. Each light 12 may include a housing 64, a lamp 66 (which may include one or more light emitting diodes) mounted within the housing 64 with suitable optics (which may include a lens 68) for providing illumination, a mounting arrangement 70 by which the housing 64 of the light 12 may be secured to an area or component of the vehicle 14, and an electrical connection 72 for supplying power to the lamp.

Figure 4:
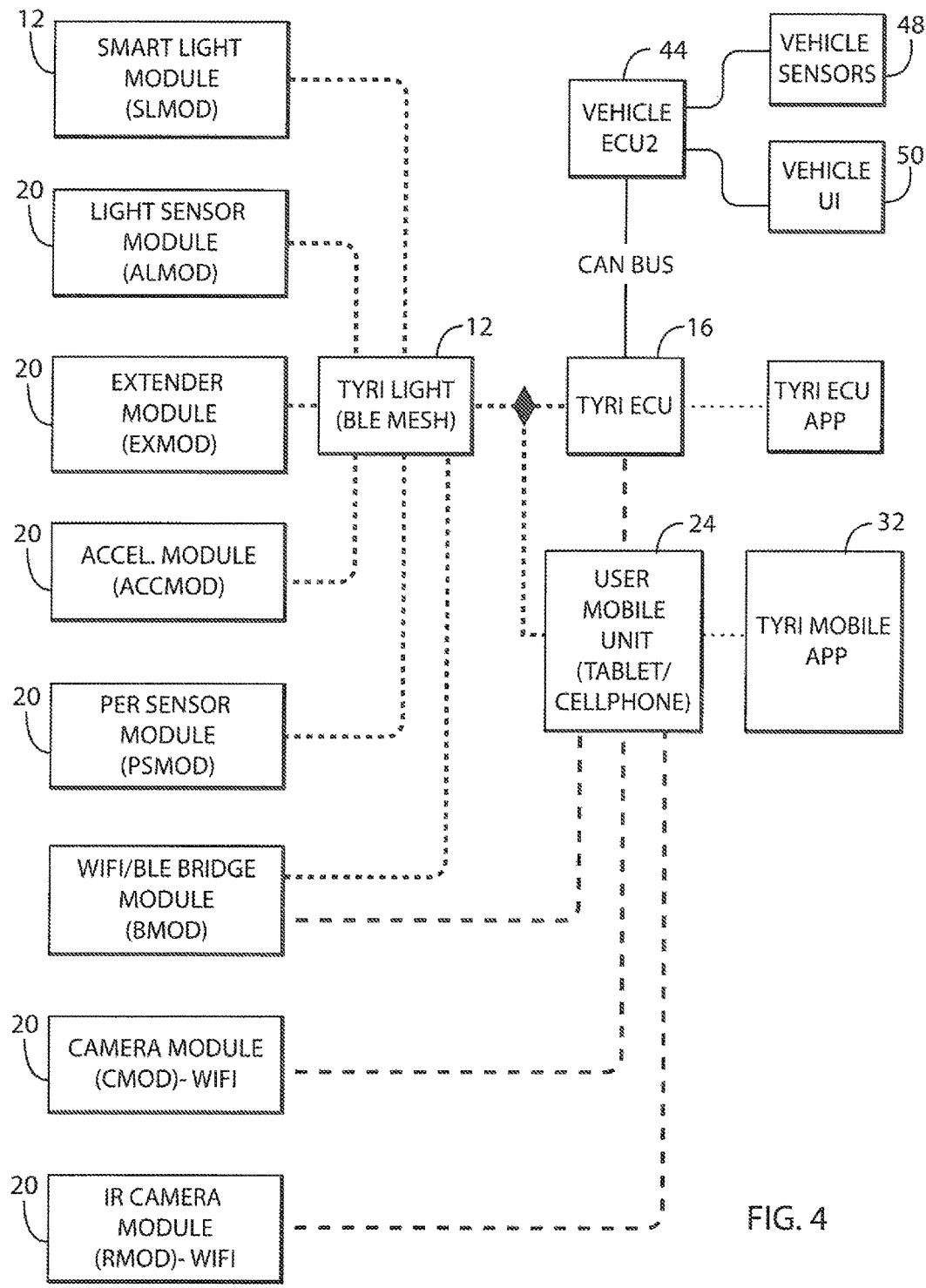
FIG. 4 is an exemplary modular view of components in the light system of FIG. 1.

With additional reference to FIG. 4, in an aspect of the invention, the lighting control application 32 of the user input device 24 may be configured to enable a user to provide inputs/commands that control the one or more functions or parameters of operation of each light 12 in accordance with certain conditions or operations. Upon receiving a sensor signal corresponding to an ambient condition, which may be from one or more of the sensors 20, the user sensors 38 and/or the vehicle sensors 48, and upon receiving receive a command signal corresponding to a command provided by a user of the user input device 24, the light controller 16 may modify a function of the light according to the sensor signal and the command signal.

In an aspect of the invention, the lighting control application 32 may be configured to enable a user to provide inputs that control the one or more functions or parameters of operation of each light 12 in accordance with certain conditions or operations and in accordance with one or more states of the state service 40. The user input device 24 and/or the light controller 16 may also be connected, such as via a wireless connection, to one or more external sensors or input devices that are provided on the vehicle 14. The user input device 24 and/or the light controller 16 may further have integrated sensors or input devices, such as the sensors 20, the user sensors 38 and/or the vehicle sensors 48. Such sensors or input devices, may include, but not be limited to, vehicle operation or condition sensors, ambient light sensors, cameras, GPS sensors, compass or directional sensors, level sensors, etc.

Inputs from the sensors and/or user input device 24 may be provided to the light controller 16, such as via a wireless communication connection, e.g. Bluetooth. The lighting control application 32 may receive and preprocess such inputs, and may then output control/command signals to the one or more light controllers 16 that may process these and other signals, such as sensor signals from the sensors 20, and subsequently output control signals to the one or more lights 12 so as to control the one or more functions or parameters of operation of each light 12 in accordance with certain conditions or operations detected or sensed by the sensors or input devices.

In an aspect of the invention, a series of the vehicle sensors 48 may also provide inputs to the vehicle controller 44 pertaining to various conditions or parameters of operation of the vehicle 14, which may be transmitted via the wired or wireless connection 46 to the light controller 16. The lighting control application 32 may receive and preprocess such inputs, including inputs from the sensors 20, and may then output control/command signals to the light controller 16 which may process these and other signals and subsequently output control signals to the one or more lights 12 so as to control the one or more functions or parameters of operation of each light 12 in accordance with certain conditions or operations detected or sensed by the sensors or input devices. The vehicle user interface 50 enables an operator to control the various vehicle operating parameters using the vehicle controller 44.

Figure 5:
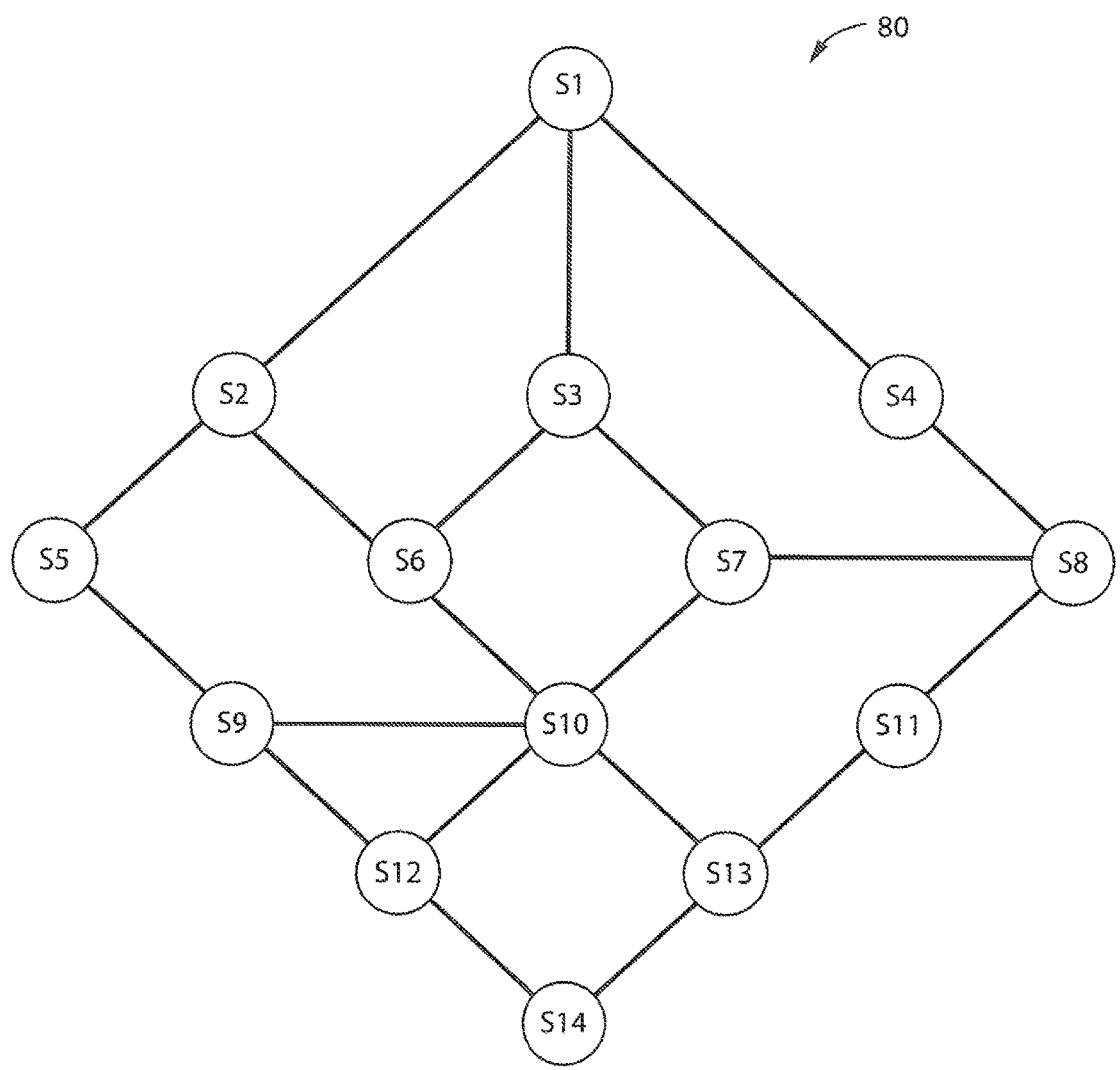
FIG. 5 is an exemplary state flow which may be maintained by the state service of the light system of FIG. 1.

With additional reference to FIG. 5, in an aspect of the invention, the state service 40 may maintain multiple states 80, such as states "S1," "S2," "S3," and so forth as shown, in a state logic implementation. Each state may define a function of one or more of the lights 12, and modifying a function of a light 12, such as according to receipt of a sensor and/or command signal, may cause a transition from one state to another. The state logic implementation and requirements for transitioning between states may be configured by the user via the lighting control application 32.

For example, in an initial state S1, all lights 12 may be deactivated. However, the lighting control application 32 may configure the system to advance to a state S2, in which a particular light 12 is activated, upon receipt of a sensor signal from a particular sensor 20, such as a proximity sensor. The lighting control application 32 may also configure the system to alternatively advance to a state S3, in which a different light 12 is activated, upon receipt of a sensor signal from a different sensor 20, such as a proximity sensor at a different location. The lighting control application 32 may also configure the system to advance, from either state S2 or S3, to a state S6, in which all light 12 are flashing, such as upon receipt of a sensor signal from another particular sensor 20, such as a level sensor which may indicate a tipping condition. It will be appreciated that numerous states may be defined to produce numerous light conditions based on numerous sensors inputs within the scope of the invention. In an alternative aspect, a look up table or other data structure may be used.

Figure 6:
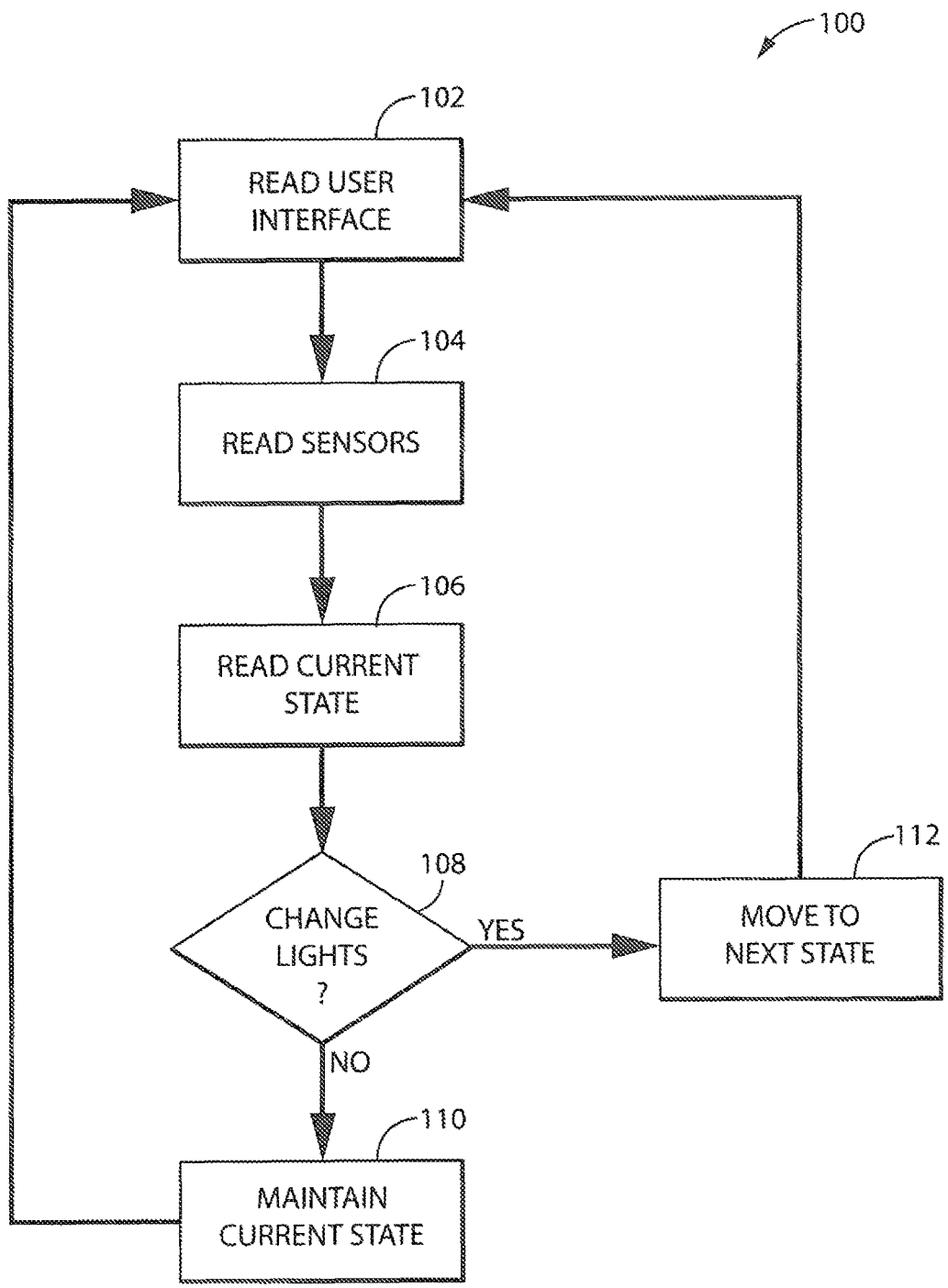
FIG. 6 is an exemplary logical flow implementing the state service of the light system of FIG. 1.

Referring now to FIG. 6, an exemplary logical flow 100 implementing the state service 40 of FIG. 1 is provided in accordance with an aspect of the invention. In process block 102, the light system may read the user input device 24, which may be represented as receiving one or more command signals. Reading the user input device 24 allows, for example, the light controller 16 to recognize conditions or requirements for advancing between states. Next, in process block 104, the light system may read the sensors in the system, such as the sensors 20, the user sensors 38 and/or the vehicle sensors 48. Next, in process block 106, the light system may read the current state, which may be tracked by the state service 40. Next, in decision block 108, the light system may determine if a condition or requirement set by the user input device 24 is satisfied based on the current state and the sensor signals received. If no particular condition or requirement is satisfied, the light system may maintain the current state in process block 110, and return to process block 102 to read again the user input device 24 from the current state. However, if a particular condition or requirement is satisfied, the light system may advance to a next particular state in process block 112, and return to process block 102 to read again the user input device 24 from the next state.

Figure 7:
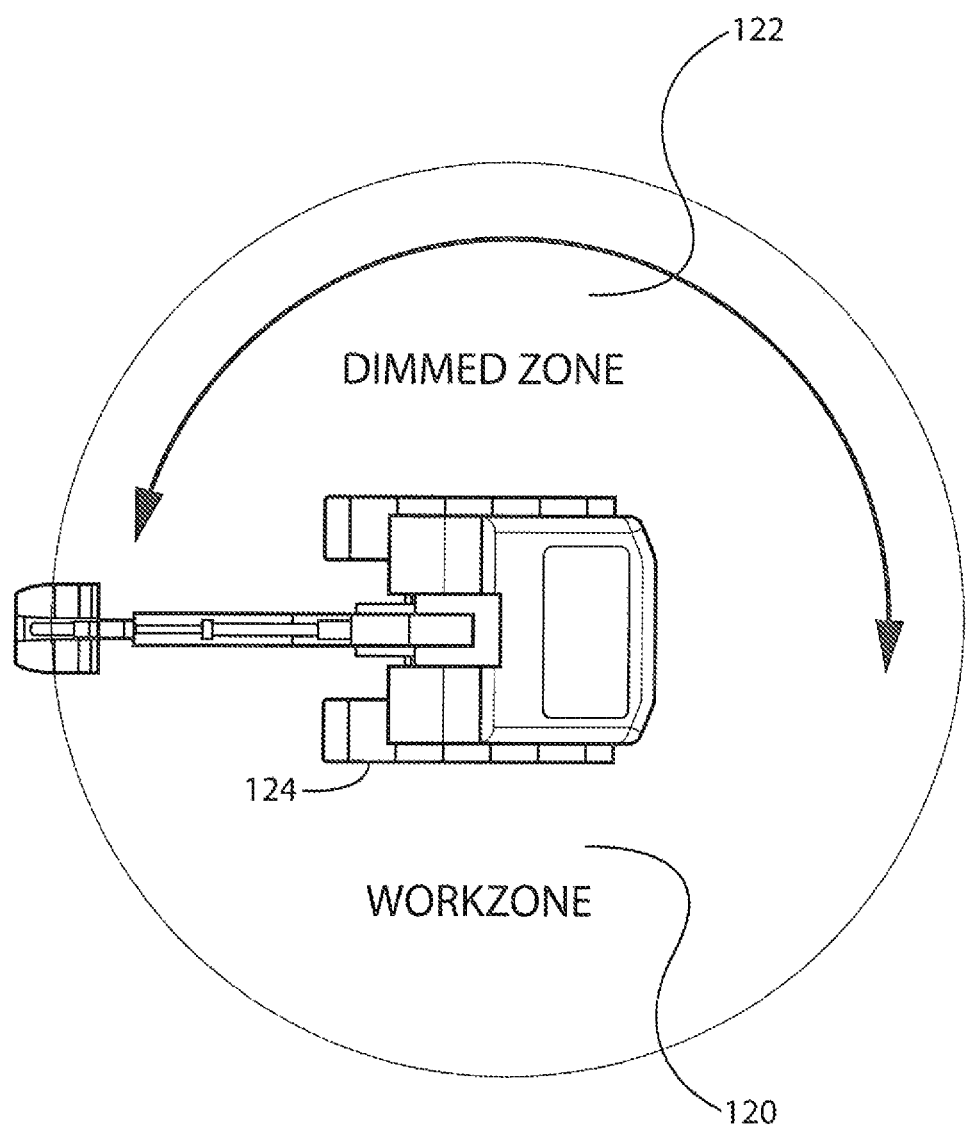
FIG. 7 is an exemplary implementation of a light system for a vehicle having a bucket or arm in accordance with an aspect of the present invention.
Figure 8:
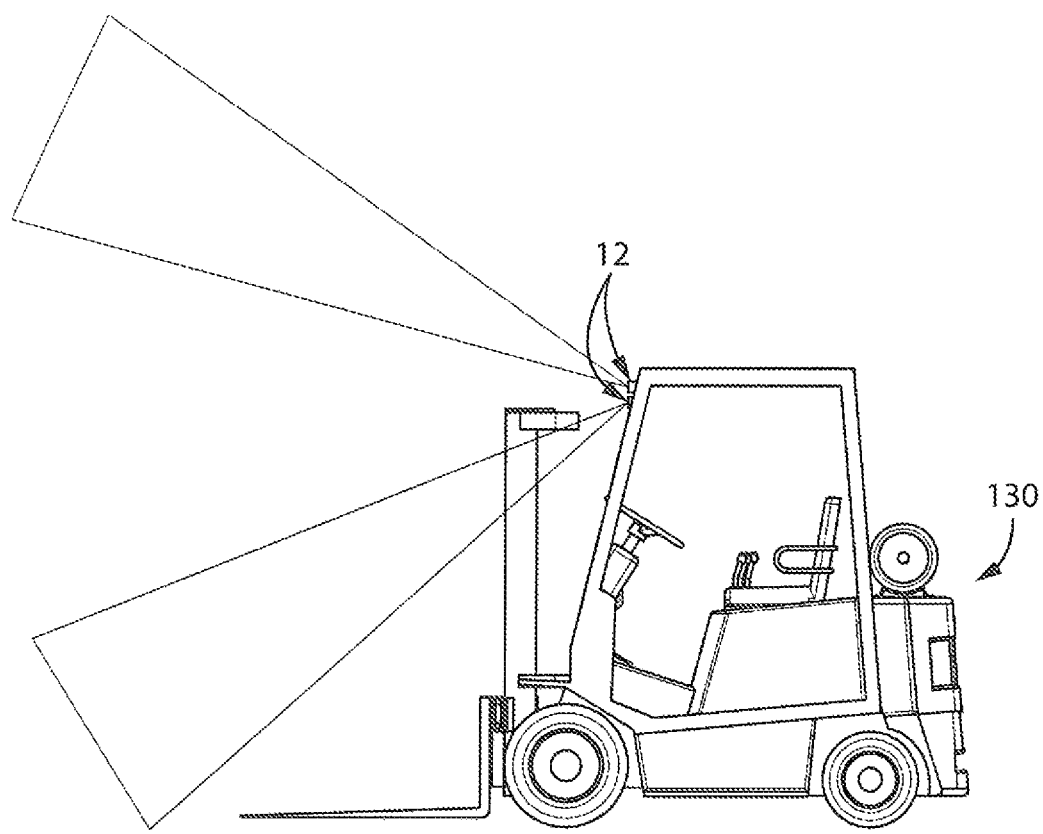
FIG. 8 is an exemplary implementation of a light system for a forklift in accordance with an aspect of the present invention.

It will be appreciated that the ability to interface vehicle sensors, condition sensors and/or operating parameter sensors with controllable vehicle lighting, in accordance with the present invention, provides a wide range of lighting control functions that can enhance vehicle operation, safety and user control. For example, and without limitation, with additional reference to FIG. 7, the control of light levels can be used to provide added illumination in a work area 120 (and dimmed illumination for power savings in a non-work area 122) when a construction vehicle 124 with a bucket or arm is positioned so as to face the work area 120. Lighting levels can be controlled so as to reduce current draw, e.g. in the event one or more of the lights 12 are illuminated when the vehicle 14 is not running, the lighting level may be reduced in accordance with the power level of the battery in order to conserve battery life. Glare can be automatically reduced in certain conditions, for example forward headlights can be automatically dimmed down when meeting other vehicles, which can be sensed using light sensors mounted to the vehicle 14. The lights 12 can be placed into a flashing mode so as to provide a visual warning for certain conditions. For example, with additional reference to FIG. 8, if the vehicle is a forklift 130 having a level sensor, it can send an input to the user input device 24 or light controller 16 indicative of a non-level condition, and in turn one or more of the vehicle lights 12 may be sent into a flashing mode to alert the surrounding area of a dangerous operating condition. The user may input certain custom conditions using the lighting control application 32, for example to provide certain defined areas of dimming. Moreover, the state service 40 may provide predefined settings or states 80 to choose from depending on laws and regulations of the current location, or even informal best practices shared by other users of a similar situation and site. For example, when the vehicle 14 is used in a traffic area such as in a road construction project, a vehicle position sensor, such as on the turntable of a backhoe or the like, can be used to automatically dim appropriate ones of the lights 12 when the lights 12 would otherwise be positioned to shine on an adjacent area. For example, the adjacent area may be a roadway and the vehicle lights 12 can be controlled so as not to shine on the roadway when the vehicle 14 is positioned such that the lights 12 face or would otherwise normally shine on the roadway. The adjacent area may also be a work area, and the lights 12 can be controlled so as not to shine on the work area when the vehicle 14 is positioned such that the lights 12 face or would otherwise normally shine on the work area and/or workers present in the work area. This can avoid glare toward oncoming traffic and for workers in the vicinity of the machine, and also save power by only illuminating the area necessary for the work being performed. The lights 12 can be dimmed to a predetermined level, or can be dimmed to a level dictated by ambient light conditions or the like. Workers on a mining site, for example, may be given suggestions by the state service 40 to use a profile specifically tailored for the dimensions and even reflections of the surrounding tunnels. The lights 12 can also be programmed so as to eliminate work light glare toward the operator, such as from areas of the vehicle 14 or from objects present within the work area. The lights 12 also may be programmed so as to vary brightness according to the position of a vehicle component. For example, in the case of a bucket or arm of FIG. 7, the lights 12 may be dimmed or brightened according to the up or down position of the bucket or arm. The user is also able to input custom illumination settings, e.g. by selecting work areas where the lights are to be dimmed or work areas where extra illumination is required or desired. One or more of the lights 12 may be illuminated based on certain movements of the vehicle 14. For example, in addition to illumination of reverse indicator lights when the vehicle 14 is moving in a reverse direction, certain of the lights may be illuminated in certain colors or patterns when the vehicle 14 is moving in a forward direction. The lights 12 may also interface with the locks, doors, occupant sensors and/or security system of the vehicle 14 to provide an anti-theft function. For example, the lights 12 may be coded so that the lights 12 can be operated only by an authorized user with the appropriate activation code. The state service 40 constitutes the authoritative source of authentication by storing and consolidating information about legitimate lamps and accompanying devices. The system of the present invention also enables the lights 12 to be controlled by a user remote from the vehicle 14. For example, a user with a user input device 24, such as a remote control or smart phone, can communicate with the lights 12 to turn one or more lights 12 on as the user approaches the vehicle and/or to turn one or more lights 12 off as the user departs the area of the vehicle. This enables the user to make a safe approach to and departure from the area of the vehicle 14 by avoiding obstacles that may otherwise be difficult to detect. With lights 12 that have a position control, the lights 12 can be turned toward the user to enhance the degree of illumination and further facilitate safe approach and departure. With the vehicle 14 normally being in an OFF mode as the user departs or approaches the vehicle 14, it is contemplated that a rechargeable battery may be connected between the vehicle electrical system and one or more of the lights 12. It is contemplated that the battery will be connected, such as via use of a cable, between the electrical system of vehicle 14 and one or more of the lights 12. The battery will include a wireless receiver for receiving signals as well as, for example, a Bluetooth communication capability. In this manner, the lights 12 can be illuminated using battery power when power from vehicle 14 is OFF. The battery can then be recharged during operation of vehicle 14. The battery may be a device in the system which may be coded to provide an anti-theft function.

It should be understood that the above description, while indicating representative embodiments of the present invention, is given by way of illustration and not of limitation. Many changes and modifications may be made within the scope of the present invention without departing from the spirit thereof, and the invention includes all such modifications.

Various additions, modifications and rearrangements are contemplated as being within the scope of the following claims, which particularly point out and distinctly claim the subject matter regarded as the invention, and it is intended that the following claims cover all such additions, modifications and rearrangements.

I claim:

1. A light system for a construction vehicle operating in a work area, comprising:
   a plurality of lights, each light having a mounting arrangement for mounting to a construction vehicle;
   a plurality of sensors, each sensor being configured to detect an ambient condition and provide a sensor signal corresponding to the ambient condition;

a user input device having a processor executing a first program stored in a non-transient medium operable to receive commands from a user via a user interface for controlling functions of the lights;

a state service executing to maintain a plurality of states with each state defining a function of the lights, the plurality of states including a first state in which the lights are off, a second state in which the lights are on, and a third state in which at least one of the lights is dimmed, wherein modifying the function of the lights moves from one state to another; and a light controller in communication with the lights, the sensors, the state service and the user input device, the light controller executing a second program stored in a non-transient medium operable to:

receive a command signal from the user input device corresponding to a command provided by a user for selectively illuminating a work area;

receive a sensor signal from a sensor relevant to the command;

determine if a requirement set by the user input device according to the command is satisfied for illuminating the work area based on a current state of the lights received from the state service and the sensor signal received from the sensor; and upon determining that the requirement is satisfied, change states to modify a function of the lights to illuminate the work area.

2. The light system of claim 1, wherein the state service maintains a state in which a function of a first light differs from a function of a second light.

3. The light system of claim 1, wherein the state service is integrated with the light controller.

4. The light system of claim 1, wherein functions of the lights include: flashing, dimming, patterning and coloring.

5. The light system of claim 1, wherein each light includes a housing, a lamp mounted within the housing for providing illumination, an electrical connection for supplying power to the lamp and a wireless interface for communication with the light controller.

6. The light system of claim 5, wherein each light further includes a variable position mechanism, and wherein a function of the light provides positioning via the variable position mechanism.

7. The light system of claim 1, wherein the light controller wirelessly receives the sensor signal and the command signal.

8. The light system of claim 1, wherein each sensor is integrated with the vehicle, and wherein the sensors include a light sensor, a position sensor and a directional sensor.

9. A light system for a construction vehicle operating in a work area, comprising:

a plurality of lights having mounting arrangements for mounting to a construction vehicle;

a light controller in communication with the lights;

a plurality of sensors in communication with the light controller, each sensor being configured to detect an ambient condition and provide a sensor signal to the light controller corresponding to the ambient condition;

a state service executing to maintain a plurality of states with each state defining a function of the lights, the plurality of states including a first state in which the lights are off, a second state in which the lights are on, and, a third state in which at least one of the lights s dimmed, wherein modifying the function of the lights moves from one state to another; and a user input device in communication with the light controller, the user input device having a processor executing a first program stored in a non-transient medium operable to receive commands from a user via a user interface for controlling functions of the lights and provide command signals to the light controller corresponding to the commands, wherein the light controller is configured to execute a second program stored in a non-transient medium operable to:

receive a command signal from the user input device corresponding to a command provided by the user for selectively illuminating a work area;

determine if a requirement set by the user input device according to the command is satisfied for illuminating the work area based on a current state of the lights received from the state service and the sensor signal received from the sensor; and upon determining that the requirement is satisfied change states to modify a function of the lights to illuminate the work area.

10. The light system of claim 9, wherein the plurality of lights is a first plurality of lights and the light controller is a first light controller, and further comprising a second plurality of lights and a second light controller in communication with the second plurality of lights, wherein the state service maintains states in which functions of the first plurality of lights differ from functions of the second plurality of lights.

11. The light system of claim 9, wherein the user input device is a mobile computing device, and wherein the state service is integrated with the user input device.

12. The light system of claim 9, wherein each light includes a housing, a lamp mounted within the housing for providing illumination, an electrical connection for supplying power to the lamp and a wireless interface for communication with the light controller.

13. The light system of claim 12, wherein each light further includes a variable position mechanism, and wherein the function of the lights provides positioning via the variable position mechanism.

14. The light system of claim 9, wherein the light controller wirelessly receives the sensor signal and the command signal.

15. The light system of claim 9, wherein at least one of the lights is provided on a bucket or arm of the construction vehicle, at least one sensor is a position sensor provided on the bucket or arm, and a function provides activating at least one of the lights upon the position sensor detecting a movement of the bucket or arm.

16. A method for controlling a plurality of lights having mounting arrangements for mounting to a construction vehicle using a plurality of sensors configured to detect ambient conditions and provide sensor signals corresponding to the ambient conditions and a user input device having a processor executing a first program stored in a non-transient medium operable to receive commands from a user via a user interface for controlling functions of the lights and provide command signals corresponding to the commands, the method comprising:

maintaining a state service providing a plurality of states with each state defining a function of the lights, the plurality of states including a first state in which the lights are off, a second state in which the lights are on, and a third state in which at least one of the lights is dimmed, wherein modifying the function of the lights moves from one state to another;

receiving a command signal from the user input device corresponding to a command provided by a user for selectively illuminating a work area;

determining if a requirement set by the user input device according to the command is satisfied for illuminating the work area based on a current state of the lights received from the state service and the sensor signal received from the sensor; and upon determining that the requirement is satisfied, change states to modify a function of the lights to illuminate the work area.

17. The method of claim 16, further comprising maintaining a state in which a function of a first light differs from a function of a second light.

\* \* \* \* \*

UNITED STATES PATENT AND TRADEMARK OFFICE
CERTIFICATE OF CORRECTION

PATENT NO. : 9,975,472 B2
APPLICATION NO. : 15/133535
DATED : May 22, 2018
INVENTOR(S) : Christian Wadell It is certified that error appears in the above-identified patent and that said Letters Patent is hereby corrected as shown below:

In the Claims

Claim 9, Column 9, Line 63, delete "oft" and substitute therefor -- off, --;

Claim 9, Column 9, Line 64, after "and" delete ",";

Claim 9, Column 9, Line 64, after "lights" delete "s" and substitute therefor -- is --;

Claim 9, Column 10, Line 19, after "satisfied" insert -- , --.

Signed and Sealed this
Tenth Day of July, 2018

Andrei Iancu
*Director of the United States Patent and Trademark Office*